(12) United States Patent
Rolfe

(10) Patent No.: US 7,619,555 B2
(45) Date of Patent: Nov. 17, 2009

(54) METHODS AND APPARATUS TO CONTACT AIRCRAFT

(75) Inventor: Eric G. Rolfe, Sudbury, MA (US)

(73) Assignee: Raytheon Company, Waltham, MA (US)

(*) Notice: Subject to any disclaimer, the term of this patent is extended or adjusted under 35 U.S.C. 154(b) by 49 days.

(21) Appl. No.: 11/940,427

(22) Filed: Nov. 15, 2007

(65) Prior Publication Data

US 2008/0186222 A1 Aug. 7, 2008

Related U.S. Application Data

(60) Provisional application No. 60/866,287, filed on Nov. 17, 2006.

(51) Int. Cl.
*G01S 13/00* (2006.01)
(52) U.S. Cl. ............................ 342/29; 342/30; 342/36
(58) Field of Classification Search ............ 342/29–51; 340/945–947; 701/14
See application file for complete search history.

(56) References Cited

U.S. PATENT DOCUMENTS

| 4,027,307 | A | * | 5/1977 | Litchford | 342/32 |
|---|---|---|---|---|---|
| 5,063,386 | A | * | 11/1991 | Bourdeau et al. | 342/40 |
| 5,381,140 | A | * | 1/1995 | Kuroda et al. | 340/961 |
| 5,406,288 | A | * | 4/1995 | Billaud et al. | 342/37 |
| 5,455,586 | A | | 10/1995 | Barbier et al. | |
| 5,825,322 | A | | 10/1998 | Capozoli | |
| 6,094,169 | A | | 7/2000 | Smith et al. | |
| 6,314,363 | B1 | * | 11/2001 | Pilley et al. | 701/120 |
| 6,314,366 | B1 | * | 11/2001 | Farmakis et al. | 701/201 |
| 6,380,869 | B1 | * | 4/2002 | Simon et al. | 340/945 |
| 6,459,411 | B2 | * | 10/2002 | Frazier et al. | 342/455 |
| 6,546,338 | B2 | * | 4/2003 | Sainthuile et al. | 701/301 |
| 6,606,563 | B2 | * | 8/2003 | Corcoran, III | 701/301 |
| 6,675,095 | B1 | * | 1/2004 | Bird et al. | 701/301 |
| 7,053,797 | B2 | * | 5/2006 | Taylor | 340/961 |
| 2003/0233192 | A1 | * | 12/2003 | Bayh et al. | 701/301 |
| 2004/0124998 | A1 | * | 7/2004 | Dame | 340/945 |
| 2004/0204801 | A1 | * | 10/2004 | Steenberge et al. | 701/3 |
| 2005/0156777 | A1 | * | 7/2005 | King et al. | 342/29 |
| 2005/0200501 | A1 | * | 9/2005 | Smith | 340/963 |
| 2008/0183344 | A1 | * | 7/2008 | Doyen et al. | 701/9 |

FOREIGN PATENT DOCUMENTS

| DE | 24 19 885 | 10/1975 |
|---|---|---|
| DE | 26 15 440 | 9/1977 |
| DE | 196 37 843 A1 | 3/1998 |
| EP | 0 521 750 A1 | 1/1993 |
| EP | 1 316 817 A3 | 6/2003 |
| WO | WO 02/082121 A1 | 10/2002 |
| WO | WO 03/009255 A | 1/2003 |

OTHER PUBLICATIONS

CSC DUATS Flyer, "AOPA Edition" Issue No. 60, Mar. 2006.*
Air Traffic Bulletin "New Technology—ADS-B, TIS-B, and FIS-B" Us Deaprtment of Transportation, FAA, Issue #2005-3, Aug. 2005.*

(Continued)

*Primary Examiner*—Thomas H Tarcza
*Assistant Examiner*—Peter M Bythrow
(74) *Attorney, Agent, or Firm*—Daly, Crowley, Mofford & Durkee, LLP

(57) ABSTRACT

Methods and apparatus to alert a pilot in an aircraft of certain conditions, such as airspace violations. In one embodiments a system uniquely identifies aircraft and send a message to alert the pilot to contact air traffic control on a selected frequency.

14 Claims, 3 Drawing Sheets

OTHER PUBLICATIONS

An approach to transitioning FAA air/ground communications to adigital system Chadwick, D.J. Moody, J.C. Elnoubi, S.M. Box, F. Mitre Corp., McLean, VA;Digital Avionics Systems Conference, 1992. Proceedings., IEEE/AIAA 11th Publication Date: Oct. 5-8, 1992.*

AOPA Safety Advisor Regulations No. 1 "Airspace for everyone" 2005.*

Minimum Operational Performance Standards for 1090 MHz Extended Squitter, Automatic Dependent Surveillance—Broadcast (ADS-B) and Traffic Information Services—Broadcast (TIS-B), 2003, vol. 1, pp. 1-777, RTCA, Inc., 1828 L. Street, NW, Suite 805, Washington, DC 20036-5133.

Minimum Operational Performance Standards for 1090 MHz Extended Squitter, Automatic Dependent Surveillance—Broadcast (ADS-B) and Traffic Information Services—Broadcast (TIS-B), 2003, vol. 2, pp. 1-349, RTCA, Inc., 1828 L. Street, NW, Suite 805, Washington, DC 20036-5133.

Notification of transmittal of the International Search Report and the Written Opinion of the International Searching Authority, or the Declaration dated Jun. 10, 2008, PCT/US2007/024031.

Notification Concerning Transmittal of International Perliminary Report on Patentability (Chapter 1 of the Patent Cooperation Treaty), PCT/US2007/024031 dated May 28, 2009.

* cited by examiner

METHODS AND APPARATUS TO CONTACT AIRCRAFT

CROSS-REFERENCE TO RELATED APPLICATIONS

The present application claims the benefit of U.S. Provisional Patent Application No. 60/866,287, filed on Nov. 17, 2006, which is incorporated herein by reference.

BACKGROUND

As is known in the art, commercial and other aircraft use voice radios to communicate with ground-based air traffic control facilities. In some cases, the ground is unable to communicate with the aircraft, due to the current setting of the radios. A radio may be tuned to the wrong frequency or inadventantly have the volume turned down, or may not be selected. In the case of VFR traffic, there is no requirement to communicate with air traffic control, so it would be unlikely that a controller would know what frequency the radio was set to.

As is also known in the art, pilots are encouraged to continuously monitor an emergency frequency in addition to the frequencies that they use for normal communication. In some cases, this is not practical since aircraft may have only one radio, or may use multiple radios in a specified sequence that precludes or discourages such frequency monitoring.

Oceanic flights communicating over HF radio use SEL-CAL codes, i.e., tone sequences that can be used by air traffic controllers to alert an aircraft to monitor a radio frequency. While this technology may work, special equipment is required onboard the aircraft. Most aircraft do not have this equipment. Also, since this approach requires the controller to know the code for a particular flight, in many cases the controller does not know the identity of the aircraft it is desirable to contact.

A developing technology known as Automatic Dependent Surveillance Broadcast (ADS-B) is being deployed by the FAA (Federal Aviation Administration). ADS-B provides the identity of aircraft having ADS capability. ADS also provides for uplink of 'broadcast' products to equipped aircraft, including weather and traffic information.

SUMMARY

The present invention provides methods and apparatus for generating an alert for a pilot of an aircraft in airspace violation and requesting the pilot to contact air traffic control. With this arrangement, inadvertent airspace violations can be remedied at relatively low cost. While exemplary embodiments of the invention are primarily shown and described in conjunction with certain flight restrictions and aircraft, it is understood that the inventive embodiments are applicable to air traffic control applications in general in which it is desirable to generate an alert to a pilot.

In one aspect of the invention, a method includes receiving identifying information for an aircraft, assigning a unique identity to an aircraft based upon the received identifying information, and broadcasting a message containing the unique identify of the aircraft to alert a pilot of the aircraft to contact a designated entity over a selected frequency. In one embodiment, the method further includes broadcasting the message after detection of an airspace violation by the aircraft.

In another aspect of the invention, a method includes broadcasting identifying information for an aircraft by the aircraft to enable a ground station to assign a unique identity to an aircraft based upon the received identifying information, and receiving message broadcast by the ground station containing the unique identify of the aircraft to alert a pilot of the aircraft to contact a designated entity over a selected frequency.

In a further aspect of the invention a system includes an ID module to store unique identifying information for aircraft, an interface module to communicate with the aircraft, and a threat assessment module to generate a message for broadcast containing a unique identify of a first one of the aircraft in airspace violation to alert a pilot of the aircraft to contact a designated entity over a selected frequency.

BRIEF DESCRIPTION OF THE DRAWINGS

The foregoing features of this invention, as well as the invention itself, may be more fully understood from the following description of the drawings in which.

DETAILED DESCRIPTION

Figure 1:
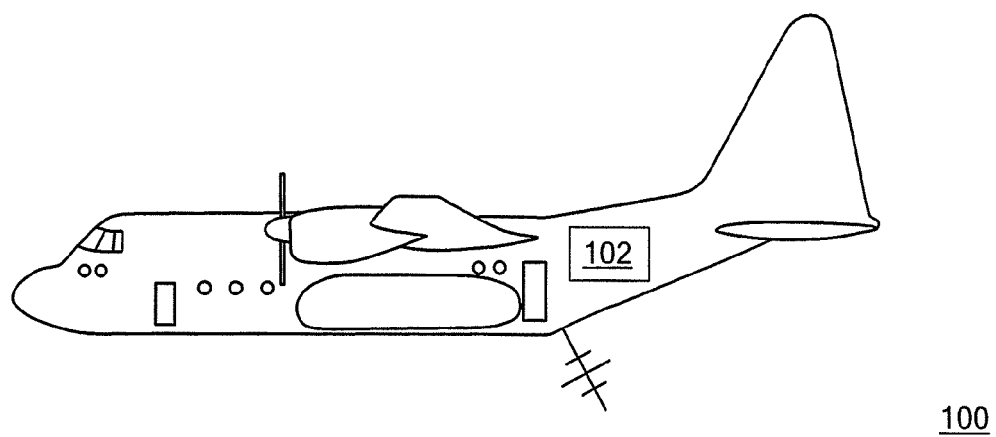
FIG. 1 is a schematic representation of a system for generating alerts to a pilot in accordance with exemplary embodiments of the invention.
Figure 1:
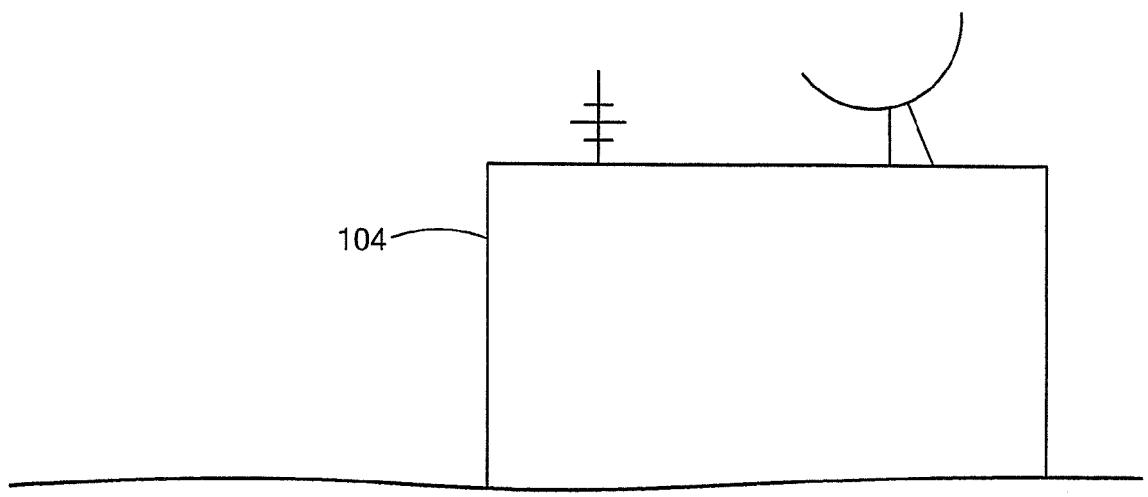

In accordance with exemplary embodiments of the invention, an ADS-B message is broadcast identifying a particular aircraft based upon its previously transmitted identity. Aircraft receiving this message would compare the received identity with its own identity. If the identities match, the pilot is alerted to contact air traffic control on an emergency frequency.

Before describing exemplary embodiments of the invention in further detail, some introductory material is provided. As will be readily appreciated, access to airspace must sometimes be restricted to protect against threats to ground or airborne assets. Monitoring and patrolling this airspace is an expensive undertaking, including full-time monitoring of air-traffic and other surveillance sensors, threat analysis and mitigation, and possibly active interdiction by armed aircraft. The effectiveness of this mission is reduced due to hundreds of accidental airspace incursions each year. These incursions waste valuable resources, induce lack-of-readiness due to a high false alarm rate, and increase the chance, each year, of a tragic, unnecessary shoot-down.

Airspace restrictions may be permanent, prohibiting access to certain airspace at all times (e.g. airspace surrounding the White House), or may be imposed temporarily, to protect certain events or operations (e.g. a spacecraft launch, firefighting operations, or a presidential visit). In addition, there are scheduled restrictions in place during periodic, predictable time intervals. A simplified summary of the various types of restrictions are shown in the following Table I below.

TABLE 1

Airspace Restrictions

| Type | Access | Type |
|---|---|---|
| Prohibited Area | Flight of aircraft prohibited at all times | Permanent |
| Restricted Areas | Certain flights and/or operations are allowed | Permanent location may be in effect only at certain times. |
| Temporary Flight Restrictions | Certain flights and/or operations may be allowed | Temporary location may be in effect only at certain times |

While prohibited and restricted areas appear on aeronautical charts, temporary flight restrictions (TFRs) are often in effect for a few hours or days. These restrictions are published in advance, when practical, but must sometimes be put in place with little advance notice due to unexpected events. The restrictions are published as Notices to Airmen (NOTAMs), and their descriptions are often long, complex, and difficult to understand.

Aircraft operating on Instrument Flight Rules (IFR) flight plans, which include most commercial passenger and cargo-carrying fights, are either not subject to the flight restriction, or are directed around the restriction by air traffic control. In effect, their cockpit operations do not require an awareness of TFRs.

Visual flight rules (VFR) aircraft (most likely General Aviation aircraft) are normally responsible for avoiding TFRs, or for following special procedures that require them to know the TFR boundaries. This is complicated by the fact, that as a group, aircraft flying VFR:

Are flown by a single pilot as compared with two pilots for many commercial operations. The pilot must divide his attention between keeping the aircraft flying, looking for other aircraft, determining his current position, and possibly communicating with air traffic controllers;

Have less advanced navigational equipment. Many are navigated with respect to ground landmarks (rivers, highways, etc.) or must rely on manually calculating their position based on radio beacons;

Have less experienced pilots. Many fly only a few tens of hours per year vs. commercial pilots who may have accumulated tens of thousands of hours of experience.

While the VFR pilot is responsible for knowing position of the aircraft, knowing the boundaries of the TFR, and understanding the rules governing it, it is not surprising that the vast majority of aircraft violating restricted airspace are operating under VFR flight rules.

Studies indicate that the probable causes of violations occur because the pilot was:

Not aware of the geographic extent of the TFR;

Not aware of the time/date of the TFR;

Not aware of the TFR procedures; or

Not aware of the TFR at all.

FIG. 1 shows an exemplary system 100, which can have similarity with an Automatic Dependent Surveillance-Broadcast (ADS-B) system, supporting ground and aircraft-based equipment to enable aircraft to continuously transmit identity, position, and intent at approximately one-second intervals. These transmissions may be received by other aircraft and by ground equipment. The system 100 also enables traffic information surveillance (TIS-B) where ground-based equipment transmits the positions of non-ADS-B equipped aircraft for receipt by equipped aircraft. The system 100 can further enable flight information surveillance broadcast (FIS-B) where ground-based equipment transmits weather and aeronautical information, including graphical depictions of TFRs for receipt by equipped aircraft.

The system 100 includes an onboard aircraft system 102 that interacts with a ground-based system 104 to generate pilot alerts for certain events, such as airspace violations, as described more fully below. The alert indicates that the pilot should contact an entity, such as air traffic control.

By providing for the display of Flight Information (FIS-B), a pilot can see a graphical display of the current aircraft position in relation to the latest TFR definition, and potentially provide a warning should the aircraft approach the geographic boundary of the restricted area. Because the data is updated "on the fly," the display can include even TFRs that are published while the aircraft is airborne.

Currently, VFR aircraft set a "non-discrete code" on their transponders to identify themselves to air traffic control. Although the aircraft's position and altitude will show up on a radar display, there is no indication as to the identity of the aircraft. VFR aircraft wishing to enter a TFR area must typically file a special flight plan. As they approach the TFR, they must identify themselves by radio, requesting entry. The air traffic controller looks for the associated flight plan, and assigns the aircraft a "discrete code", which the pilot enters into his transponder. This code, which shows up on the radar display, is then used to identify the aircraft. Once the aircraft can be uniquely identified, it may be given permission to enter the restricted airspace. Security personnel are able to evaluate whether the aircraft is flying according to the plan, and to contact the aircraft.

The ADS-B system can eliminate the code request/assignment step as automated processing can match the ADS-B transmitted code to the flight plan, significantly reducing controller workload.

A significant number of TFR violations occur because the pilot inadvertently switches his transponder back to a non-discrete code after being cleared to approach his destination airport. This error happens because this code switch is a ubiquitous procedure for normal operations (outside the TFR). Since the unique ADS-B code will continue to be transmitted, this type of violation is also be eliminated.

Further, should an aircraft enter the TFR without approval, security personnel can use the code to identify the aircraft, including size and performance characteristics, prior history, etc. This will enable a more rapid and complete threat assessment.

Regardless of the information provided by the aircraft, there is always the possibility that an unfriendly aircraft may have had its ADS-B equipment tampered with in order to provide misleading information. Continuous evaluation of broadcast information with other surveillance and intelligence information sources will still be desirable to characterize the threat.

Figure 2:
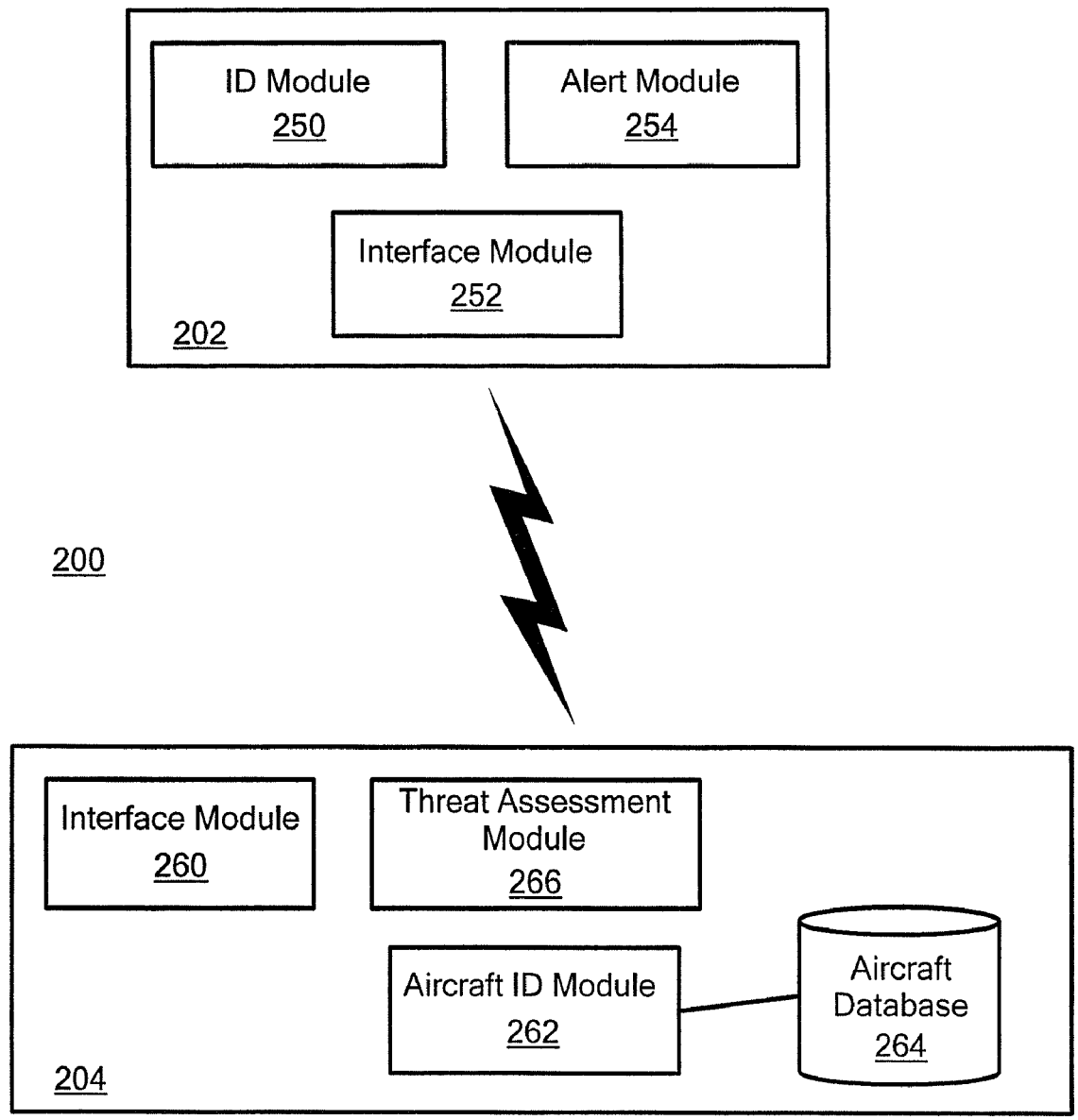
FIG. 2 is a schematic depiction of a system for generating alerts to a pilot in accordance with exemplary embodiments of the invention.

FIG. 2 shows further details of a system 200 for generating alerts to a pilot in accordance with exemplary embodiments of the invention. An aircraft module 202, which can be disposed in a vehicle, such as an aircraft, helicopter, ship, submarine, automobile, etc., interacts with a remote, e.g., ground-based, module 204.

The aircraft module 202 includes an ID module 250 for storing unique identifying information for the aircraft. An interface module 252 enables the module 202 to communicate with the remote module 204. An alert module 254 compares an ID contained in a received message to the ID for the aircraft. If the IDs match, i.e., the message is addressed to the aircraft, the alert module 254 generates an alert signal for the pilot. The alert signal can be provided as any type of energy that can be perceived by the pilot. Exemplary alerts include sounds, such as beeps, lights, such as flashes, and the like.

The remote module 204 includes an interface module 260 for generating messages for transmission and capturing received messages. An aircraft ID module 262 stores and retrieves aircraft IDs from an aircraft database 264. As each aircraft sends unique identifying information, the aircraft ID module 262 stores this information to enable the remote module to later broadcast messages containing the ID for the given aircraft.

The remote module 204 can further include a threat assessment module 266. The threat assessment module 266 can determine whether a particular aircraft presents a threat based upon various criteria. The threat assessment module 266 can generate messages for a particular aircraft to attempt to request that a pilot contact air traffic control. The broadcast message to generate the alert for the pilot will contain the unique ID for the aircraft. In one embodiment, the alert indicates that the pilot should tune to the emergency radio frequency (normally 121.5 MHz) for further instruction.

Figure 3:
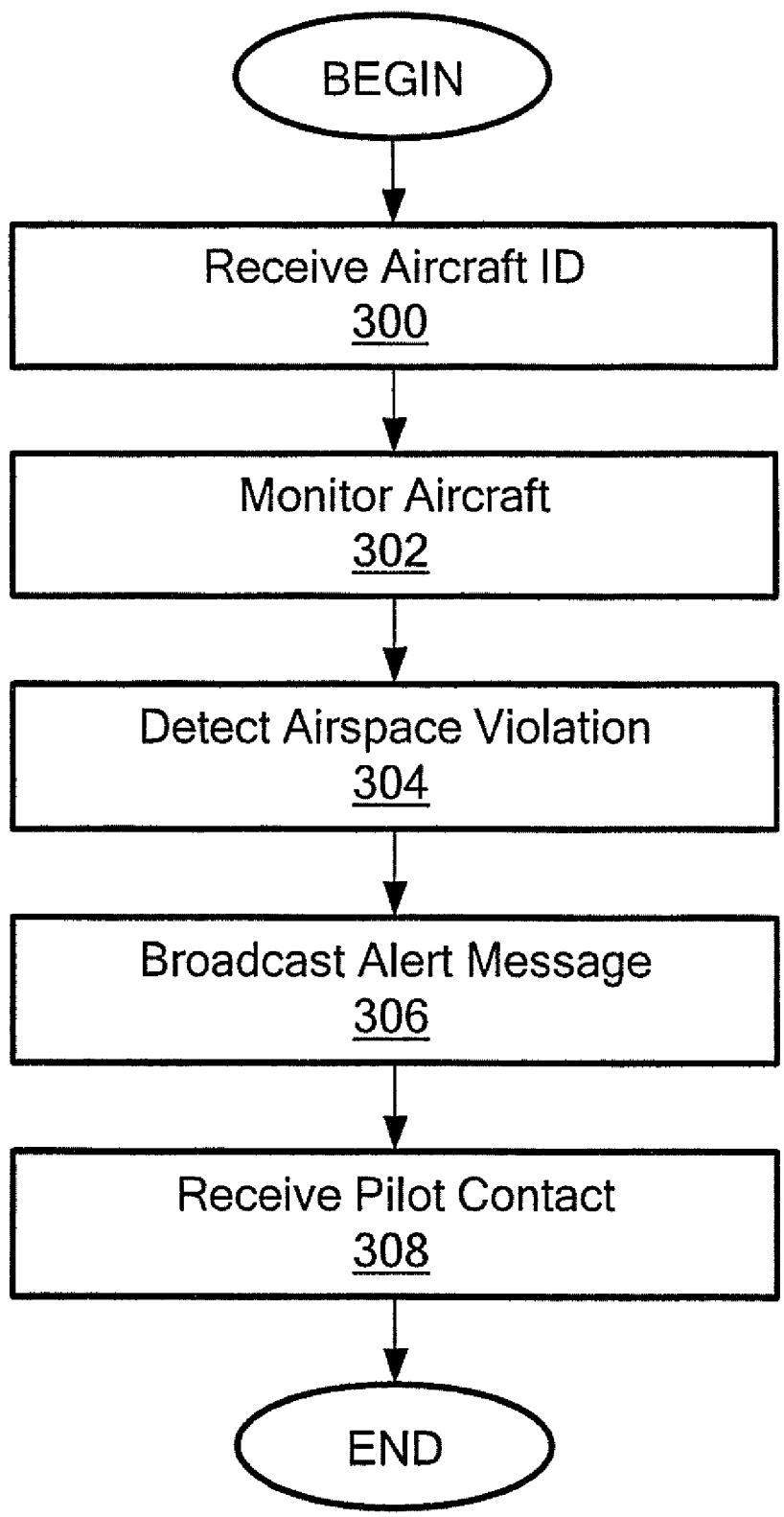
FIG. 3 is a flow diagram showing an exemplary sequence of steps for generating alerts to a pilot in accordance with exemplary embodiments of the invention.

FIG. 3 shows an exemplary sequence of steps for generating alerts for a pilot to contact air traffic control or other entity. In step 300, a remote system receives a message from a module on an aircraft containing unique identifying information for the aircraft. In step 302, the aircraft is monitored, such as by air traffic control. In step 304, an airspace violation is detected for an given aircraft. In step 306, a message is broadcast containing the unique ID of the aircraft in violation. The aircraft module receives the message, determines that the message is addressed to it, and generates an alert for the pilot to contact air traffic control. In step 308, the remote module or air traffic control, for example, receives contact from the pilot at the designated frequency.

With this arrangement, a pilot can be informed of an airspace violation. In an exemplary embodiment, the pilot can be provided directions for exiting the airspace. A pilot that can be contacted early enough may be able to exit the airspace without the need to launch an intercept mission. Although pilots are encouraged to monitor the emergency frequency whenever possible, radio limitations or conventional radio frequency assignment procedures often preclude this, particularly in the terminal/approach phase of flight.

In another embodiment, a CF code from the TIS-B message format is used for messaging to alert a pilot. If the 24-bit ICAO address provided in the AA field matches the "ownship" ICAO address, and the CF code were equal to 7, for example (currently unused and reserved). Then this would indicate that the aircraft should immediately tune the radio to the emergency or "guard" frequency. See for, example, the RTCA DO-260A, Minimum Operational Performance Standards for 1090 MHz Extended Squitter Automatic Dependent Surveillance-Broadcast (ADS-B) and Traffic Information System-Broadcast (TIS-B), which is incorporated herein by reference.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
  receiving identifying information in an ADS-B message for an aircraft;
  assigning a unique identity to an aircraft based upon the received ADS-B identifying information;
  broadcasting a message containing the unique identify of the aircraft and an alert signal to alert a pilot of the aircraft to contact a designated entity over a selected frequency after detection of a temporary flight restriction (TFR) airspace violation by the aircraft.

2. The method according to claim 1, further including receiving contact from the aircraft in response to the step of broadcasting the message.

3. The method according to claim 2, further including providing directions to the aircraft to terminate the airspace violation.

4. The method according to claim 1, wherein the broadcast message includes a CF code from a TIS-B message format.

5. The method according to claim 1, further including performing a threat assessment of the aircraft.

6. The method according to claim 5, further including evaluating broadcast information from the aircraft in view of radar surveillance information for the aircraft.

7. The method according to claim 1, wherein the selected frequency is the emergency radio frequency.

8. A method, comprising:
  broadcasting identifying information for an aircraft by the aircraft to enable a ground station to assign a unique identity to an aircraft based upon the received identifying information;
  receiving message broadcast by the ground station containing the unique identify of the aircraft to alert a pilot of the aircraft to contact a designated entity over a selected frequency after a temporary flight restriction (TFR) violation by the aircraft.

9. The method according to claim 8, further including sending a message in response to receiving the message from the ground station.

10. The method according to claim 9, further including receiving directions for terminating the airspace violation.

11. The method according to claim 8, wherein the selected frequency is the emergency radio frequency.

12. A system, comprising:
  an ID module to store unique identifying information received from aircraft;
  an interface module to communicate with the aircraft; and
  a threat assessment module to generate a message for broadcast containing a unique identify of a first one of the aircraft in airspace violation to alert a pilot of the aircraft to contact a designated entity over a selected frequency.

13. The system according to claim 12, wherein the airspace violation is a flight restriction.

14. The system according to claim 12, wherein the message includes directions to the aircraft to terminate the airspace violation.

* * * * *